(12) United States Patent
Bacthu et al.

(10) Patent No.: US 10,333,828 B2
(45) Date of Patent: Jun. 25, 2019

(54) BIDIRECTIONAL MULTICASTING OVER VIRTUAL PORT CHANNEL

(71) Applicant: Cisco Technology, Inc., San Jose, CA (US)

(72) Inventors: Nataraj Bacthu, Sunnyvale, CA (US); Raghava Sivaramu, Sunnyvale, CA (US); Srinivasan Ramabadran, Sunnyvale, CA (US); Terry Fangcheng Tang, San Jose, CA (US); Lenin Babu Dontuboyina, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 62 days.

(21) Appl. No.: 15/216,651

(22) Filed: Jul. 21, 2016

(65) Prior Publication Data

US 2017/0346721 A1 Nov. 30, 2017

Related U.S. Application Data

(60) Provisional application No. 62/343,737, filed on May 31, 2016.

(51) Int. Cl.
*H04L 12/761* (2013.01)
*H04L 12/46* (2006.01)
(Continued)

(52) U.S. Cl.
CPC .......... *H04L 45/16* (2013.01); *H04L 12/1886* (2013.01); *H04L 12/4641* (2013.01);
(Continued)

(58) Field of Classification Search
CPC ..... H04L 45/16; H04L 49/70; H04L 12/4641; H04L 45/70; H04L 49/201
See application file for complete search history.

(56) References Cited

U.S. PATENT DOCUMENTS

| 4,298,770 A | 11/1981 | Nishihara et al. |
| 4,636,919 A | 1/1987 | Itakura et al. |

(Continued)

FOREIGN PATENT DOCUMENTS

| CN | 103297552 | 9/2013 |
| CN | 104639464 | 5/2015 |

(Continued)

OTHER PUBLICATIONS

International Search Report and Written Opinion from the International Searching Authority, dated Aug. 28, 2017, for the corresponding International Application No. PCT/US2017/033909, 12 pages.

(Continued)

*Primary Examiner* — Chi Ho A Lee
(74) *Attorney, Agent, or Firm* — Polsinelli PC

(57) ABSTRACT

Aspects of the subject technology relate to systems for arbitrating direct forwarder ("DF") instantiation between VPC peers used to facilitating the transport of bidirectional multicast traffic over a L2/L3 network boundary. In some aspects, arbitration of DF instantiation on a given VPC peer can include determining a first set of metrics for a first VPC switch, determining a second set of metrics for a second VPC switch, and determining, at the first VPC switch, whether to instantiate a designated forwarder (DF) operation based on a comparison of the first set of metrics and the second set of metrics. Methods and machine-readable media are also provided.

17 Claims, 6 Drawing Sheets

(51) Int. Cl.
*H04L 12/721* (2013.01)
*H04L 12/931* (2013.01)
*H04L 12/18* (2006.01)

(52) U.S. Cl.
CPC ............ *H04L 45/70* (2013.01); *H04L 49/201* (2013.01); *H04L 49/354* (2013.01); *H04L 49/70* (2013.01)

(56) References Cited

U.S. PATENT DOCUMENTS

| | | |
|---|---|---|
| 4,700,016 A | 10/1987 | Hitchcock et al. |
| 5,859,835 A | 1/1999 | Varma et al. |
| 5,926,458 A | 7/1999 | Yin |
| 5,983,278 A | 11/1999 | Chong et al. |
| 6,230,231 B1 | 5/2001 | Delong et al. |
| 6,330,614 B1 | 12/2001 | Aggarwal et al. |
| 6,389,031 B1 | 5/2002 | Chao et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,769,033 B1 | 7/2004 | Bass et al. |
| 6,834,139 B1 | 12/2004 | Prairie et al. |
| 6,876,952 B1 | 4/2005 | Kappler et al. |
| 6,907,039 B2 | 6/2005 | Shen |
| 6,941,649 B2 | 9/2005 | Goergen et al. |
| 6,952,421 B1 | 10/2005 | Slater |
| 6,954,463 B1 | 10/2005 | Ma et al. |
| 6,996,099 B1 | 2/2006 | Kadambi et al. |
| 7,068,667 B2 | 6/2006 | Foster et al. |
| 7,152,117 B1 | 12/2006 | Stapp et al. |
| 7,177,946 B1 | 2/2007 | Kaluve et al. |
| 7,181,530 B1 | 2/2007 | Halasz et al. |
| 7,216,161 B1 | 5/2007 | Peckham et al. |
| 7,336,670 B1 | 2/2008 | Calhoun et al. |
| 7,372,857 B1 | 5/2008 | Kappler et al. |
| 7,379,459 B2 | 5/2008 | Ohnishi |
| 7,411,915 B1 | 8/2008 | Spain et al. |
| 7,426,604 B1 | 9/2008 | Rygh et al. |
| 7,463,590 B2 | 12/2008 | Mualem et al. |
| 7,630,368 B2 | 12/2009 | Tripathi et al. |
| 7,729,296 B1 | 6/2010 | Choudhary et al. |
| 7,735,114 B2 | 6/2010 | Kwan et al. |
| 7,738,377 B1 | 6/2010 | Agostino et al. |
| 7,742,406 B1 | 6/2010 | Muppala |
| 7,826,469 B1 | 11/2010 | Li et al. |
| 7,940,763 B1 | 5/2011 | Kastenholz |
| 8,028,160 B1 | 9/2011 | Orr |
| 8,170,025 B2 | 5/2012 | Kloth et al. |
| 8,190,843 B1 | 5/2012 | De Forest et al. |
| 8,195,736 B2 | 6/2012 | Malloy et al. |
| 8,302,301 B2 | 11/2012 | Lau |
| 8,325,459 B2 | 12/2012 | Mutnury et al. |
| 8,339,973 B1 | 12/2012 | Pichumani et al. |
| 8,369,335 B2 | 2/2013 | Jha et al. |
| 8,423,632 B2 | 4/2013 | Yin et al. |
| 8,509,087 B2 | 8/2013 | Rajagopalan et al. |
| 8,515,682 B2 | 8/2013 | Buhler et al. |
| 8,605,575 B2 | 12/2013 | Gunukula et al. |
| 8,645,984 B2 | 2/2014 | Beskrovny et al. |
| 8,687,629 B1 | 4/2014 | Kompella et al. |
| 8,752,175 B2 | 6/2014 | Porter |
| 8,868,766 B1 | 10/2014 | Theimer et al. |
| 8,874,876 B2 | 10/2014 | Bhadra et al. |
| 8,934,340 B1 | 1/2015 | Mater et al. |
| 8,995,272 B2 | 3/2015 | Agarwal et al. |
| 9,031,959 B2 | 5/2015 | Liu |
| 9,053,070 B1 | 6/2015 | Arguelles |
| 9,197,553 B2 | 11/2015 | Jain et al. |
| 9,203,188 B1 | 12/2015 | Siechen et al. |
| 9,203,753 B2 | 12/2015 | Leung et al. |
| 9,241,005 B1 | 1/2016 | Orr |
| 9,258,195 B1 | 2/2016 | Pendleton et al. |
| 9,274,710 B1 * | 3/2016 | Oikarinen ............... G06F 3/061 |
| 9,356,942 B1 | 5/2016 | Joffe |
| 9,374,294 B1 | 6/2016 | Pani |
| 9,402,470 B2 | 8/2016 | Shen et al. |
| 9,407,501 B2 | 8/2016 | Yadav et al. |
| 9,414,224 B1 | 8/2016 | Schmidt et al. |
| 9,433,081 B1 | 8/2016 | Xiong et al. |
| 9,444,634 B2 | 9/2016 | Pani et al. |
| 9,502,111 B2 | 11/2016 | Dharmapurikar et al. |
| 9,509,092 B2 | 11/2016 | Shen et al. |
| 9,544,224 B2 | 1/2017 | Chu et al. |
| 9,565,202 B1 | 2/2017 | Kindlund et al. |
| 9,590,914 B2 | 3/2017 | Alizadeh Attar et al. |
| 9,602,424 B1 * | 3/2017 | Vincent ................... H04L 47/70 |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,667,431 B2 | 5/2017 | Pani |
| 9,667,551 B2 | 5/2017 | Edsall et al. |
| 9,669,459 B2 * | 6/2017 | Guthrie ............. B22D 17/2007 |
| 9,674,086 B2 | 6/2017 | Ma et al. |
| 9,686,180 B2 | 6/2017 | Chu et al. |
| 9,698,994 B2 | 7/2017 | Pani |
| 9,710,407 B2 * | 7/2017 | Oikarinen ............... G06F 13/18 |
| 9,716,665 B2 | 7/2017 | Alizadeh Attar et al. |
| 9,729,387 B2 | 8/2017 | Agarwal et al. |
| 9,742,673 B2 | 8/2017 | Banerjee et al. |
| 9,755,965 B1 | 9/2017 | Yadav et al. |
| 9,838,248 B1 | 12/2017 | Grammel et al. |
| 2002/0124107 A1 | 9/2002 | Goodwin |
| 2002/0126671 A1 | 9/2002 | Ellis et al. |
| 2002/0146026 A1 | 10/2002 | Unitt et al. |
| 2003/0035385 A1 | 2/2003 | Walsh et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0123462 A1 | 7/2003 | Kusayanagi |
| 2003/0137940 A1 | 7/2003 | Schwartz et al. |
| 2003/0174650 A1 | 9/2003 | Shankar et al. |
| 2003/0231646 A1 | 12/2003 | Chandra et al. |
| 2004/0062259 A1 | 4/2004 | Jeffries et al. |
| 2004/0073715 A1 | 4/2004 | Folkes et al. |
| 2004/0085974 A1 | 5/2004 | Mies et al. |
| 2004/0100901 A1 | 5/2004 | Bellows |
| 2004/0103310 A1 | 5/2004 | Sobel et al. |
| 2004/0160956 A1 | 8/2004 | Hardy et al. |
| 2004/0249960 A1 | 12/2004 | Hardy et al. |
| 2005/0002386 A1 | 1/2005 | Shiragaki |
| 2005/0007961 A1 | 1/2005 | Scott et al. |
| 2005/0013280 A1 | 1/2005 | Buddhikot et al. |
| 2005/0083933 A1 * | 4/2005 | Fine ........................ H04L 12/18 370/390 |
| 2005/0114541 A1 | 5/2005 | Ghetie et al. |
| 2005/0144290 A1 | 6/2005 | Mallal et al. |
| 2005/0175020 A1 | 8/2005 | Park et al. |
| 2005/0207410 A1 | 9/2005 | Adhikari et al. |
| 2005/0281392 A1 | 12/2005 | Weeks et al. |
| 2006/0028285 A1 | 2/2006 | Jang et al. |
| 2006/0031643 A1 | 2/2006 | Figueira |
| 2006/0078120 A1 | 4/2006 | Mahendran et al. |
| 2006/0123481 A1 | 6/2006 | Bhatnagar et al. |
| 2006/0183488 A1 | 8/2006 | Billhartz |
| 2006/0198315 A1 | 9/2006 | Sasagawa et al. |
| 2006/0200862 A1 | 9/2006 | Olson et al. |
| 2006/0209688 A1 | 9/2006 | Tsuge et al. |
| 2006/0221835 A1 | 10/2006 | Sweeney et al. |
| 2006/0250982 A1 | 11/2006 | Yuan et al. |
| 2006/0268742 A1 | 11/2006 | Chu et al. |
| 2006/0280179 A1 | 12/2006 | Meier |
| 2007/0006211 A1 | 1/2007 | Venkiteswaran |
| 2007/0025241 A1 | 2/2007 | Nadeau et al. |
| 2007/0083913 A1 | 4/2007 | Griffin et al. |
| 2007/0104198 A1 | 5/2007 | Kalluri et al. |
| 2007/0133566 A1 | 6/2007 | Copps |
| 2007/0165627 A1 | 7/2007 | Sultan et al. |
| 2007/0223372 A1 | 9/2007 | Haalen et al. |
| 2007/0274229 A1 | 11/2007 | Scholl et al. |

(56) References Cited

U.S. PATENT DOCUMENTS

| | | |
|---|---|---|
| 2007/0280264 A1 | 12/2007 | Milton et al. |
| 2008/0031130 A1 | 2/2008 | Raj et al. |
| 2008/0031247 A1 | 2/2008 | Tahara et al. |
| 2008/0092213 A1 | 4/2008 | Wei et al. |
| 2008/0120691 A1 | 5/2008 | Flewallen et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0196100 A1 | 8/2008 | Madhavan et al. |
| 2008/0196102 A1 | 8/2008 | Roesch |
| 2008/0225853 A1 | 9/2008 | Melman et al. |
| 2008/0243495 A1 | 10/2008 | Anandakumar et al. |
| 2008/0253366 A1 | 10/2008 | Zuk et al. |
| 2008/0253556 A1 | 10/2008 | Cobb et al. |
| 2008/0263665 A1 | 10/2008 | Ma et al. |
| 2008/0298330 A1 | 12/2008 | Leitch |
| 2008/0298360 A1 | 12/2008 | Wijnands et al. |
| 2008/0310421 A1 | 12/2008 | Teisberg et al. |
| 2009/0010153 A1 | 1/2009 | Filsfils et al. |
| 2009/0044005 A1 | 2/2009 | Komura et al. |
| 2009/0086629 A1 | 4/2009 | Zhang et al. |
| 2009/0094357 A1 | 4/2009 | Keohane et al. |
| 2009/0103566 A1 | 4/2009 | Kloth et al. |
| 2009/0106838 A1 | 4/2009 | Clark et al. |
| 2009/0122805 A1 | 5/2009 | Epps et al. |
| 2009/0144680 A1 | 6/2009 | Lehavot et al. |
| 2009/0188711 A1 | 7/2009 | Ahmad |
| 2009/0193103 A1 | 7/2009 | Small et al. |
| 2009/0232011 A1 | 9/2009 | Li et al. |
| 2009/0238179 A1 | 9/2009 | Samprathi |
| 2009/0249096 A1 | 10/2009 | Conner et al. |
| 2009/0268614 A1 | 10/2009 | Tay et al. |
| 2009/0268617 A1 | 10/2009 | Wei et al. |
| 2010/0128619 A1 | 5/2010 | Shigei |
| 2010/0150155 A1 | 6/2010 | Napierala |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0265849 A1 | 10/2010 | Harel |
| 2010/0281155 A1 | 11/2010 | Cipollone et al. |
| 2010/0287227 A1 | 11/2010 | Goel et al. |
| 2010/0290472 A1 | 11/2010 | Raman et al. |
| 2010/0299553 A1 | 11/2010 | Cen |
| 2010/0312875 A1 | 12/2010 | Wilerson et al. |
| 2011/0002339 A1 | 1/2011 | Fok |
| 2011/0007638 A1 | 1/2011 | Xu et al. |
| 2011/0110241 A1 | 5/2011 | Atkinson et al. |
| 2011/0138310 A1 | 6/2011 | Gomez et al. |
| 2011/0153722 A1 | 6/2011 | Choudhary et al. |
| 2011/0158248 A1 | 6/2011 | Vorunganti et al. |
| 2011/0170426 A1 | 7/2011 | Kompella et al. |
| 2011/0173699 A1 | 7/2011 | Figlin et al. |
| 2011/0185073 A1 | 7/2011 | Jagadeeswaran et al. |
| 2011/0203834 A1 | 8/2011 | Yoneya et al. |
| 2011/0211578 A1 | 9/2011 | Zwiebel et al. |
| 2011/0213894 A1 | 9/2011 | Silberstein et al. |
| 2011/0228795 A1 | 9/2011 | Agrawal et al. |
| 2011/0239273 A1 | 9/2011 | Yang et al. |
| 2011/0249682 A1 | 10/2011 | Kean et al. |
| 2011/0268118 A1 | 11/2011 | Schlansker et al. |
| 2011/0273990 A1* | 11/2011 | Rajagopalan ........... H04L 45/00 370/238 |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0163164 A1 | 6/2012 | Terry et al. |
| 2012/0163396 A1 | 6/2012 | Cheng et al. |
| 2012/0218896 A1 | 8/2012 | Ygberg et al. |
| 2012/0246307 A1 | 9/2012 | Malloy et al. |
| 2012/0275304 A1 | 11/2012 | Patel et al. |
| 2012/0300787 A1 | 11/2012 | Korger |
| 2012/0311621 A1* | 12/2012 | Foster ................. H04L 65/4076 725/14 |
| 2013/0003732 A1* | 1/2013 | Dholakia ................ H04L 12/18 370/390 |
| 2013/0007879 A1 | 1/2013 | Esteban et al. |
| 2013/0019277 A1 | 1/2013 | Chang et al. |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0122825 A1 | 5/2013 | Deforge et al. |
| 2013/0124708 A1 | 5/2013 | Lee et al. |
| 2013/0155846 A1 | 6/2013 | Ramachandran et al. |
| 2013/0182712 A1 | 7/2013 | Aguayo et al. |
| 2013/0242795 A1 | 9/2013 | Heen et al. |
| 2013/0250951 A1 | 9/2013 | Koganti et al. |
| 2013/0311637 A1 | 11/2013 | Kamath et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2013/0347105 A1 | 12/2013 | Nuemann et al. |
| 2014/0016501 A1 | 1/2014 | Kamath et al. |
| 2014/0047264 A1 | 2/2014 | Wang et al. |
| 2014/0052852 A1 | 2/2014 | Dufour et al. |
| 2014/0056298 A1 | 2/2014 | Vobbilisetty et al. |
| 2014/0064278 A1 | 3/2014 | Santos et al. |
| 2014/0068750 A1 | 3/2014 | Tjahjono et al. |
| 2014/0086253 A1 | 3/2014 | Yong |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0258465 A1 | 9/2014 | Li |
| 2014/0269705 A1 | 9/2014 | Decusatis et al. |
| 2014/0269710 A1 | 9/2014 | Sundaram et al. |
| 2014/0269712 A1 | 9/2014 | Kidambi et al. |
| 2014/0280846 A1 | 9/2014 | Gourlay et al. |
| 2014/0294005 A1 | 10/2014 | Jain et al. |
| 2014/0307744 A1 | 10/2014 | Dunbar et al. |
| 2014/0321277 A1 | 10/2014 | Lynn, Jr. et al. |
| 2014/0334295 A1 | 11/2014 | Guichard et al. |
| 2014/0334304 A1 | 11/2014 | Zang et al. |
| 2014/0334317 A1 | 11/2014 | Atreya et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0058470 A1 | 2/2015 | Duda |
| 2015/0073920 A1 | 3/2015 | Pashkevich et al. |
| 2015/0082418 A1 | 3/2015 | Gu |
| 2015/0092551 A1 | 4/2015 | Moisand et al. |
| 2015/0092593 A1 | 4/2015 | Kompella et al. |
| 2015/0103679 A1 | 4/2015 | Tessmer et al. |
| 2015/0113143 A1 | 4/2015 | Stuart et al. |
| 2015/0124629 A1 | 5/2015 | Pani et al. |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124821 A1 | 5/2015 | Chu et al. |
| 2015/0124822 A1 | 5/2015 | Chu et al. |
| 2015/0124823 A1 | 5/2015 | Pani et al. |
| 2015/0124824 A1 | 5/2015 | Edsall et al. |
| 2015/0124825 A1 | 5/2015 | Dharmapurikar et al. |
| 2015/0124833 A1 | 5/2015 | Ma et al. |
| 2015/0127701 A1 | 5/2015 | Chu et al. |

(56) References Cited

U.S. PATENT DOCUMENTS

| | | | |
|---|---|---|---|
| 2015/0131445 A1 | 5/2015 | Nie et al. | |
| 2015/0133201 A1 | 5/2015 | Szabo et al. | |
| 2015/0188769 A1 | 7/2015 | Gu | |
| 2015/0188770 A1 | 7/2015 | Naiksatann et al. | |
| 2015/0222516 A1 | 8/2015 | Deval et al. | |
| 2015/0236900 A1 | 8/2015 | Chung et al. | |
| 2015/0249608 A1 | 9/2015 | Zhang et al. | |
| 2015/0271104 A1 | 9/2015 | Chikkamath et al. | |
| 2015/0280959 A1* | 10/2015 | Vincent | H04L 67/1097 709/203 |
| 2015/0288709 A1 | 10/2015 | Singhal et al. | |
| 2015/0334632 A1 | 11/2015 | Rudolph et al. | |
| 2015/0378712 A1 | 12/2015 | Cameron et al. | |
| 2015/0378969 A1 | 12/2015 | Powell et al. | |
| 2016/0006664 A1 | 1/2016 | Sabato et al. | |
| 2016/0080350 A1 | 3/2016 | Chaturvedi et al. | |
| 2016/0119204 A1 | 4/2016 | Murasato et al. | |
| 2016/0134563 A1 | 5/2016 | Yu et al. | |
| 2016/0149751 A1 | 5/2016 | Pani et al. | |
| 2016/0173511 A1 | 6/2016 | Bratspiess et al. | |
| 2016/0205069 A1 | 7/2016 | Blocher et al. | |
| 2016/0255118 A1 | 9/2016 | Wang | |
| 2016/0315811 A1 | 10/2016 | Yadav et al. | |
| 2017/0034161 A1 | 2/2017 | Isola et al. | |
| 2017/0104636 A1* | 4/2017 | Vora | G06F 8/65 |
| 2017/0111360 A1 | 4/2017 | Hooda et al. | |
| 2017/0126718 A1 | 5/2017 | Baradaran et al. | |
| 2017/0142207 A1 | 5/2017 | Gupta et al. | |
| 2017/0149637 A1 | 5/2017 | Banikazemi et al. | |
| 2017/0163491 A1 | 6/2017 | Tonouchi | |
| 2017/0207961 A1 | 7/2017 | Saxena et al. | |
| 2017/0214619 A1 | 7/2017 | Chu et al. | |
| 2017/0222898 A1 | 8/2017 | Acharya et al. | |
| 2017/0237651 A1 | 8/2017 | Pani | |
| 2017/0237667 A1 | 8/2017 | Wang | |
| 2017/0237678 A1 | 8/2017 | Ma et al. | |
| 2017/0250912 A1 | 8/2017 | Chu et al. | |
| 2017/0257260 A1 | 9/2017 | Govindan et al. | |
| 2017/0288948 A1* | 10/2017 | Singh | H04L 41/0659 |
| 2017/0294088 A1 | 10/2017 | Patterson et al. | |

FOREIGN PATENT DOCUMENTS

| | | |
|---|---|---|
| EP | 2431883 A2 | 3/2012 |
| EP | 2621136 | 7/2013 |
| EP | 3208721 A8 | 10/2017 |
| JP | 2007-267074 A | 10/2007 |
| WO | WO-2006/101668 A2 | 9/2006 |
| WO | WO-2009115480 A1 | 9/2009 |
| WO | WO-2014/071996 A1 | 5/2014 |
| WO | WO 2016/081659 | 5/2016 |

OTHER PUBLICATIONS

Cisco, At-A-Glance Brochure, "Cisco Fabric Path," 2010, 2 pages; http://www.cisco.com/en/US/prod/collateral/switches/ps9441/ps9402/at_a_glance_c45-605626.pdf.

Cisco, Design Guide, "Cisco FabricPath Design Guide: Using Fabric Path with an Aggregation and Access Topology," 2011, 53 pages; http://www.cisco.com/en/US/prod/collateral/switches/ps9441/ps9670/guide_c07-690079.pdf.

Cisco, Guide, "Intermediate System-to-Intermediate System (IS—IS) TLVs, Document ID 5739," updated Aug. 10, 2005, 7 pages; http://www.cisco.com/image/gif/paws/5739/tivs_5739.pdf.

Cisco, White Paper, "Cisco Fabric Path for Cisco Nexus 7000 Series Switches," Sep. 7, 2011, 44 pages; http://www.cisco.com/en/US/prod/collateral/switches/ps9441/ps9402/white_paper_c11-687554.pdf.

Eastlake, et al., "Proposed Standard, RBridges: TRILL Header Options," TRILL Working Group Internet-Draft, Dec. 24, 2009, 18 pages; http://tools.ietf.org/html/draft-ietf-trill-rbridge-options-00.

Eastlake, et al., "Proposed Standard, RBridges: Further TRILL Header Options," TRILL Working Group Internet Draft, Dec. 1, 2011, 20 pages; http://tools.ietf.org/html/draft-ietf-trill-rbridge-options-06.

Eastlake, et al., "Transparent Interconnection of Lots of Links (TRILL) Use of IS-IS," RFC 6326, Jul. 2011, 26 pages; http://tools.ietf.org/html/rfc6326.

Eastlake, et al., "Routing Bridges (RBridges): Adjacency," RFC 6327, Jul. 2011, 27 pages; http://tools.ietf.org/html/rfc6327.

Leiserson, Charles E., "Fat-Trees: Universal Networks for Hardware-Efficient Supercomputing," IEEE Transactions on Computers, vol. c-34, No. 10, Oct. 1985, 10 pages; http://courses.csail.mitedu/6.896/spring04/handouts/papers/fat_trees.pdf.

Perlman, et al., "Introduction to TRILL," The Internet Protocol Journal, vol. 14, No. 3, Sep. 2011, 19 pages; http://www.cisco.com/web/about/ac123/ac147/archived_issues/ipj_14-3/143_trill.html.

Perlman, et al., "Routing Bridges (RBridges): Base Protocol Specification," RFC 6325, Jul. 2011, 100 pages; http://tools.ietf.org/html/rfc6325.

Touch, et al., "Transparent Interconnection of Lots of Links (TRILL): Problem and Applicability Statement," RFC 5556, May 2009, 18 pages; http://tools.ietf.org/html/rfc5556.

Notification of Transmittal of the International Search Report and the Written Opinion of the International Search Authority, or the Declaration dated Feb. 10, 2016 in PCT Application No. PCT/US2015/061429 in 13 pages.

Brocade Communications Systems, Inc., "Multi-Chassis Trunking for Resilient and High-Performance Network Architectures," White Paper, vvww_brocade.com, 2010, 8 pages.

Cisco Systems, Inc., "Design and Configuration Guide: Best Practices for Virtual Port Channels (vPC) on Cisco Nexus 7000 Series Switches," Revised Aug. 2014, 116 pages.

Cisco Systems, Inc., "Chapter 2: Virtual Port Channel Operations," Cisco Nexus 5000 Series NX-OS Operations Guide, Release 5.0(3)N2(1), Jun. 11, 2012, 18 pages.

Cisco Systems, Inc., "Cisco Nexus 1000V VXLAN Configuration Guide, Release 4.2(1)SV2(2.1), Chapter 1, Information About VXLANs," Jun. 21, 2013, 6 pages.

Onisick, Joe, "VXLAN Deep Dive," Genesis Framework, Wordpress, Nov. 6, 2012, 8 pages.

VMware, Inc., "VMware Network Virtualization Design Guide, Technical White Paper," Jan. 2013, 25 pages.

International Search Report and Written Opinion dated Feb. 25, 2015 for corresponding PCT Application No. PCT/US2014/063555.

Abdo, E., "HOST_ID TCP Options: Implementation &Preliminary Test Results," Network Working Group Internet Draft draft-abdo-hostid-tcpopt-implementation-03, Jul. 16, 2012, 30 pages; http://tools.ietf.org/pdf/draft-abdo-hostid-tcpopt-implementation-03.pdf.

Boucadair, M., et al., "Analysis of Solution Candidates to Reveal a Host Identifier (Host ID) in Shared Address Deployments," IETF Intarea WG Internet-Draft draft-ietf-intarea-nat-reveal-analysis-05, Feb. 14, 2013, 22 pages.

Schaumann, Jan, "L3DSR—Overcoming Layer 2 Limitations of Direct Server Return Load Balancing," NANOG 51, Miami, Jan. 30, 2011, 33 pages.

Spijker, Rick Van'T, "Dissertation Module for Master of Science—Mobile and Distributed Computer Networks," Leeds Metropolitan University, May 31, 2010, pp. 1-78.

Wikipedia®, "X-Forwarded-For," retrieved and printed from Internet Mar. 9, 2018, 4 pages; http://en.wikipedia.org/w/index.php?title=X-Forwarded-For&oldid=542207414.

Yourtchenko, D., et al., "Revealing hosts sharing an IP address using TCP option," Network Working Group Internet Draft draft-wing-nat-reveal-option-03.txt, Dec. 8, 2011, 10 pages.

Beyah, Raheem, et al., "Rogue Access Point Detection using Temporal Traffic Characteristics," In Global Telecommunications Conference, 2004, Globecom'04, IEEE, 2004, vol. 4, pp. 2271-2275.

Shetty, Sachin, et al., "Rogue Access Point Detection by Analyzing Network Traffic Characteristics," pp. 1-7.

Kao, Kuo-Fong, et al. "A location-aware rogue AP detection system based on wireless packet sniffing of sensor APs" Abstract, 1 page,

(56) References Cited

OTHER PUBLICATIONS

Proceedings of the 2011 ACM Symposium on Applied Computing, ACM, 2011.

* cited by examiner

BIDIRECTIONAL MULTICASTING OVER VIRTUAL PORT CHANNEL

CROSS-REFERENCE TO RELATED APPLICATIONS

This application claims the benefit of U.S. Provisional Application No. 62/343,737 filed May 31, 2016, entitled "Bidirectional Multicasting Over Virtual Port Channel", which is incorporated herein by reference.

BACKGROUND

The subject technology relates to systems and methods for implementing bidirectional protocol independent multicasting (Bidir PIM) in Virtual Port Channel (VPC) environments in multicast network implementations.

The soaring demand for network data throughout the globe has steadily fueled the evolution of networking technologies, as engineers and manufacturers rush to keep pace with the changing data consumption landscape and increasing network scalability requirements. Various network technologies have been developed to meet the demand for network data. For example, overlay network solutions, such as virtual extensible local area networks (VXLANs), as well as virtualization and cloud computing technologies, have been widely implemented.

Overlay solutions are sometimes used to allow virtual networks to be created over a physical network infrastructure. Accordingly, overlay networks allow network administrators to expand physical network infrastructures through the use of virtual networks. Overlay networks can also provide logical network isolation, which allow data centers or providers to host a large number of customers (i.e., "tenants") while providing each customer their own isolated network domain.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
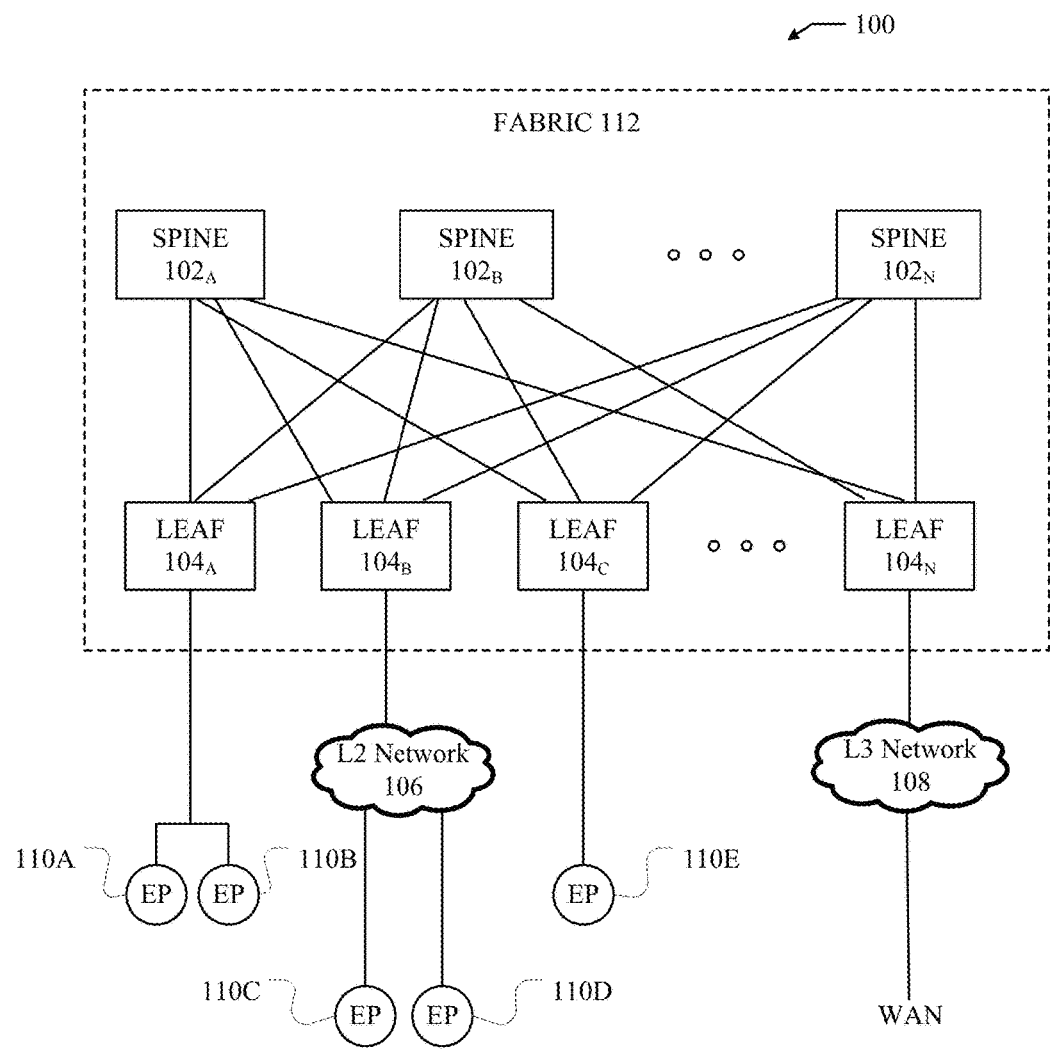
FIG. 1 conceptually illustrates an example network fabric, according to some implementations of the subject technology.

The detailed description set forth below is intended as a description of various configurations of the technology and is not intended to represent the only configurations in which the technology can be practiced. The appended drawings are incorporated herein and constitute a part of the detailed description. The detailed description includes specific details for the purpose of providing a more thorough understanding of the subject technology. However, it is clear that the technology is not limited to the specific details set forth herein, and that aspects of the technology can be practiced without these details. In some instances, structures and components are shown in block diagram form in order to avoid obscuring certain concepts of the technology.

OVERVIEW

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communication links located in the same geographic region, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme that allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNID), such as a VXLAN network identifier, which can specifically identify an associated virtual segment or domain.

DESCRIPTION

In some aspects, overlay networks can be configured for transporting multicast traffic. As used herein, "multicast" or "IP multicast" can refer to a bandwidth-conserving technology that reduces traffic by delivering a single stream of information simultaneously, for example, to potentially thousands of receivers (e.g., businesses and/or homes).

Applications that take advantage of multicast include can include, but are not limited to: video conferencing, corporate communications, distance learning, and distribution of software, stock quotes, and news, etc.

IP multicast routing enables a host (source) to send packets to a group of hosts (receivers) anywhere within the IP network by using a special form of IP address called the IP multicast group address. The sending host inserts the multicast group address into the IP destination address field of the packet and IP multicast routers and multilayer switches forward incoming IP multicast packets out all interfaces that lead to the members of the multicast group. Any host, regardless of whether it is a member of a group, can send to a group. However, only the members of a group receive the message.

IP communication consists of hosts that act as senders and receivers of traffic. As used herein, senders may be referred to as "sources." In some aspects, IP communication is accomplished by a single host source sending packets to another single host (unicast transmission) or to all hosts (broadcast transmission). IP multicast provides a third scheme, allowing a host to send packets to a subset of all hosts (multicast transmission). This subset of receiving hosts is called a multicast group. The hosts that belong to a multicast group are called group members. A multicast group can include an arbitrary number of receivers that join a group in order to receive a particular data stream. This multicast group has no physical or geographical boundaries—the hosts can be located anywhere on the Internet or on any private internetwork. Hosts that are interested in receiving data from a source to a particular group must join that group. Joining a group is accomplished by a host receiver by way of the Internet Group Management Protocol (IGMP).

A multicast group is identified by its multicast group address. Multicast packets are delivered to that multicast group address. Unlike unicast addresses that uniquely identify a single host, multicast IP addresses do not identify a particular host. To receive the data sent to a multicast address, a host must join the group that address identifies. The data is sent to the multicast address and received by all the hosts that have joined the group indicating that they wish to receive traffic sent to that group. The multicast group address is assigned to a group at the source.

IP multicast delivery modes differ only for the receiver hosts, not for the source hosts. A source host sends IP multicast packets with its own IP address as the IP source address of the packet and a group address as the IP destination address of the packet. There are three types of delivery modes for multicast: (1) Any Source Multicast (ASM), (2) Source Specific Multicast (SSM), and bidirectional protocol independent multicast (e.g., "bidir PIM").

For the ASM delivery mode, an IP multicast receiver host can use any version of IGMP to join a multicast group. This group is notated as Gin the routing table state notation. By joining this group, the receiver host is indicating that it wants to receive IP multicast traffic sent by any source to group G. The network will deliver IP multicast packets from any source host with the destination address G to all receiver hosts in the network that have joined group G. In some aspects, ASM requires group address allocation within the network. At any given time, an ASM group should only be used by a single application. When two applications use the same ASM group simultaneously, receiver hosts of both applications will receive traffic from both application sources. This may result in unexpected excess traffic in the network. This situation may cause congestion of network links and malfunction of the application receiver hosts.

Source Specific Multicast (SSM) is a datagram delivery model that best supports one-to-many applications, also known as broadcast applications. SSM is a core network technology for the Cisco implementation of IP multicast targeted for audio and video broadcast application environments. For the SSM delivery mode, an IP multicast receiver host must use IGMP Version 3 (IGMPv3) to subscribe to channel (S, G). By subscribing to this channel, the receiver host is indicating that it wants to receive IP multicast traffic sent by source host S to group G. The network will deliver IP multicast packets from source host S to group G to all hosts in the network that have subscribed to the channel (S, G). SSM does not require group address allocation within the network, only within each source host. Different applications running on the same source host must use different SSM groups. Different applications running on different source hosts can arbitrarily reuse SSM group addresses without causing any excess traffic on the network.

The Protocol Independent Multicast (PIM) protocol maintains the current IP multicast service mode of receiver-initiated membership. PIM is not dependent on a specific unicast routing protocol; it is IP routing protocol independent and can leverage whichever unicast routing protocols are used to populate the unicast routing table, including Enhanced Interior Gateway Routing Protocol (EIGRP), Open Shortest Path First (OSPF), Border Gateway Protocol (BGP), and static routes. PIM uses unicast routing information to perform the multicast forwarding function.

Bidirectional PIM (bidir-PIM) is a variant of the PIM protocol that was designed for efficient many-to-many communications. Multicast groups in bidirectional mode can scale to an arbitrary number of sources with only a minimal amount of additional overhead. The shared trees that are created in PIM sparse mode are unidirectional. This means that a source tree must be created to bring the data stream to a rendezvous point ("RP") (the root of the shared tree) and then it can be forwarded down the branches to the receivers. Source data cannot flow up the shared tree toward the RP—this would be considered a bidirectional shared tree.

Although VPC solutions exist for transporting multicast data traffic in ASM and SSM delivery models, no loop-free solutions exist for multicast data traffic in Bidirectional PIM mode. In particular, there are no solutions for preventing reverse packet forwarding by VPC peers. As such, in some bidirectional PIM implementations, traffic loops through VPC peers occur until the looping traffic times out, e.g., until a time-to-live (TTL) value reaches 0.

Aspects of the subject technology address the foregoing limitations of bidirectional PIM by providing ways in which arbitration can occur between VPC peer switches to determine which switch is permitted to function as a designated forwarder (DF). That is, arbitration can be performed to determine which VPC peer is elected as the DF, and is therefore permitted to put traffic on a link toward RP (e.g. "RPF link"), or to re-forward traffic received off of the RPF link.

As discussed in further detail below, in particular, with respect to FIGS. 4 and 5), DF election can be performed based on a determination of which VPC peer has the best route to RP. By way of example, unicast metrics can be used to determine which VPC peer can provide the most efficient route to RP. DF election can be reevaluated, for example, at predetermined (periodic) time intervals, or performed in response to detected changes in network parameters, and/or forwarding paths, etc.

By way of background, FIG. 1 illustrates a schematic block diagram of example architecture 100 for a network fabric 112, in which some aspects of the technology can be implemented. Network fabric 112 includes spine switches 102A, 102B, ..., 102N (collectively "102") connected to leaf switches 104A, 104B, 104C, ..., 104N (collectively "104") in network fabric 112.

Spine switches 102 can be L2 switches in fabric 112; that is, spine switches 102 can be configured to perform L2 functionalities. In some implementations, one or more of spine switches 102 can be configured to host a proxy function that performs a lookup of the endpoint address identifier to locator mapping in a mapping database on behalf of leaf switches 104 that do not have such mapping. The proxy function can do this by parsing through the packet to the encapsulated tenant packet to get to the destination locator address of the tenant. Spine switches 102 can then perform a lookup of their local mapping database to determine the correct locator address of the packet and forward the packet to the locator address without changing certain fields in the header of the packet.

When a packet is received at spine switch 102*i*, spine switch 102*i* can first check if the destination locator address is a proxy address. If so, spine switch 102*i* can perform the proxy function as previously mentioned. If not, spine switch 102*i* can lookup the locator in its forwarding table and forward the packet accordingly.

Spine switches 102 connect to leaf switches 104 in fabric 112. Leaf switches 104 can include access ports (or non-fabric ports) and fabric ports. Fabric ports can provide uplinks to spine switches 102, while access ports can provide connectivity for devices, hosts, endpoints, VMs, or external networks to fabric 112.

Leaf switches 104 can reside at the edge of fabric 112, and can thus represent the physical network edge. In some cases, leaf switches 104 can be top-of-rack ("ToR") switches configured according to a ToR architecture. In other cases, leaf switches 104 can be aggregation switches in any particular topology, such as end-of-row (EoR) or middle-of-row (MoR) topologies. In some aspects, leaf switches 104 can also represent aggregation switches, for example.

Leaf switches 104 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc. Moreover, leaf switches 104 can contain virtual switching functionalities, such as a virtual tunnel endpoint (VTEP) function as explained below in the discussion of VTEP 208 in FIG. 2. To this end, leaf switches 104 can connect fabric 112 to an overlay network, such as overlay network 200 illustrated in FIG. 2.

Network connectivity in the fabric 112 can flow through leaf switches 104. Here, leaf switches 104 can provide servers, resources, endpoints, external networks, or VMs access to fabric 112, and can connect leaf switches 104 to each other. In some cases, leaf switches 104 can connect EPGs to fabric 112 and/or any external networks. Each EPG can connect to fabric 112 via one of leaf switches 104, for example.

Endpoints 110A-E (collectively "110") can connect to fabric 112 via leaf switches 104. For example, endpoints 110A and 110B can connect directly to leaf switch 104A, which can connect endpoints 110A and 110B to fabric 112 and/or any other one of leaf switches 104. Similarly, endpoint 110E can connect directly to leaf switch 104C, which can connect endpoint 110E to fabric 112 and/or any other of leaf switches 104. On the other hand, endpoints 110C and 110D can connect to leaf switch 104B via L2 network 106. Similarly, the wide area network (WAN) can connect to leaf switches 104C or 104D via L2 network 108.

Figure 2:
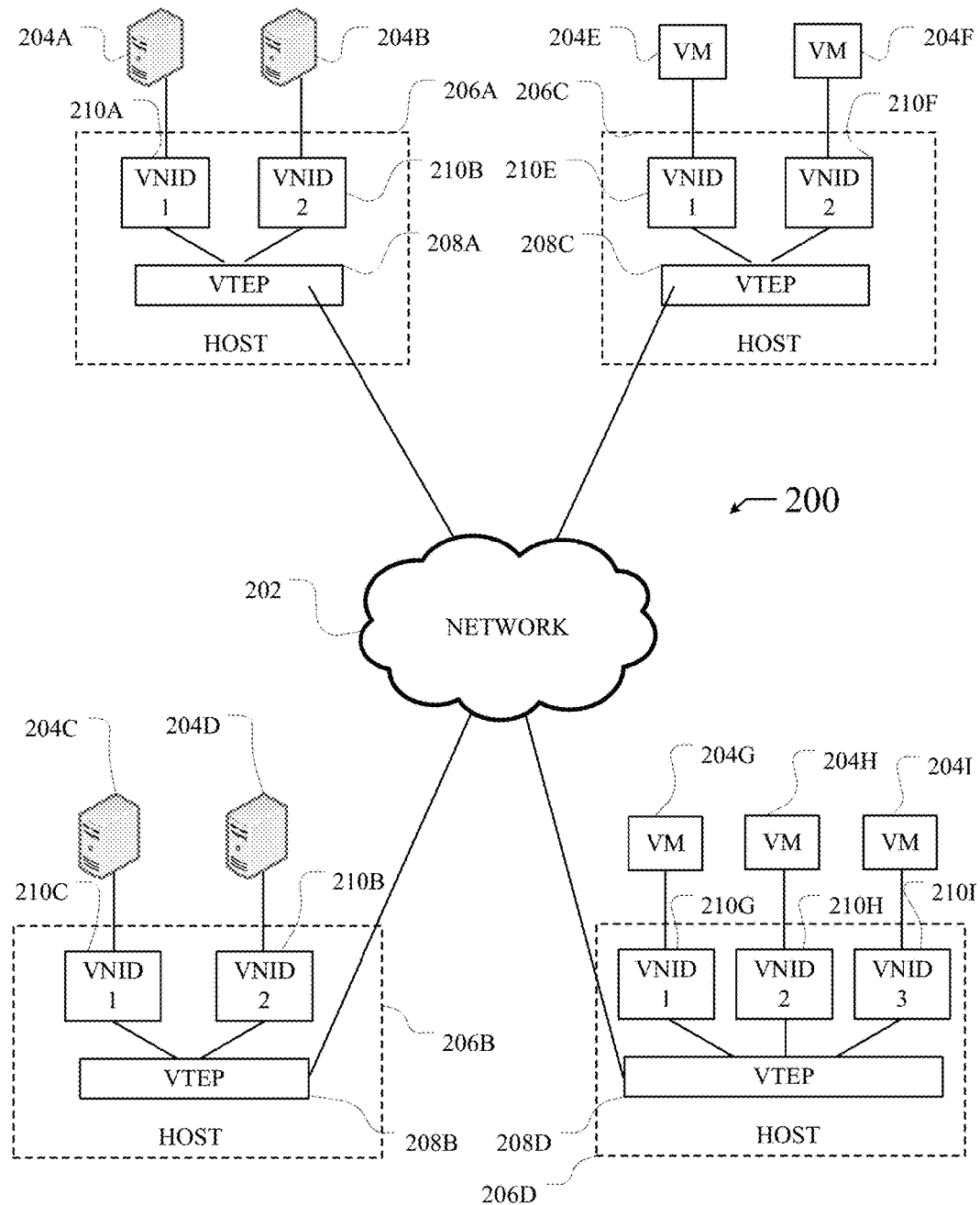
FIG. 2 illustrates an example overlay network, according to some implementations of the technology.

FIG. 2 illustrates an example overlay network 200. Overlay network 200 uses an overlay protocol, such as VXLAN, VGRE, VO3, or STT, to encapsulate traffic in L2 and/or L3 packets which can cross L3 boundaries in the network. As illustrated in FIG. 2, overlay network 200 can include hosts 206A-D interconnected via network 202.

Network 202 can include any packet network, such as an IP network, for example. Moreover, hosts 206A-D include virtual tunnel end points (VTEP) 208A-D, which can be virtual nodes or switches configured to encapsulate and de-encapsulate data traffic according to a specific overlay protocol of the network 200, for the various virtual network identifiers (VNIDs) 210A-I. Moreover, hosts 206A-D can include servers containing a virtual tunnel endpoint functionality and virtual workloads. However, in some cases, one or more hosts can also be a physical switch, such as a ToR switch, configured with a virtual tunnel endpoint functionality. For example, hosts 206A and 206B can be physical switches configured with a VTEP. Here, the hosts 206A and 206B can be connected to servers 203A-D, which can include virtual workloads through VMs, for example.

In some embodiments, overlay network 200 can be a VXLAN network, and VTEPs 208A-D can be VXLAN tunnel end points. However, as one of ordinary skill in the art will readily recognize, network 200 can represent any type of overlay or software-defined network, such as NVGRE, STT, or even overlay technologies yet to be invented.

The VNIDs can represent the segregated virtual networks in overlay network 200. Each of the overlay tunnels (VTEPs 208A-D) can include one or more VNIDs. For example, VTEP 208A can include VNIDs 1 and 2, VTEP 208B can include VNIDs 1 and 3, VTEP 208C can include VNIDs 1 and 2, and VTEP 208D can include VNIDs 1-3. As one of ordinary skill in the art will readily recognize, any particular VTEP can, in other embodiments, have numerous VNIDs, including more than the 3 VNIDs illustrated in FIG. 2.

Traffic in overlay network 200 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Endpoints and VMs 203A-I can connect to their respective VNID or virtual segment, and communicate with other endpoints or VMs residing in the same VNID or virtual segment. For example, endpoint 303A can communicate with endpoint 303C and VMs 303E and 303G because they all reside in the same VNID, namely, VNID 1. Similarly, endpoint 203B can communicate with VMs 203F, H because they all reside in VNID 2.

VTEPs 208A-D can encapsulate packets directed at the various VNIDs 1-3 in overlay network 200 according to the specific overlay protocol implemented, such as VXLAN, so traffic can be properly transmitted to the correct VNID and recipient(s). Moreover, when a switch, router, or other network device receives a packet to be transmitted to a recipient in overlay network 200, it can analyze a routing table, such as a lookup table, to determine where such packet needs to be transmitted so the traffic reaches the appropriate recipient. For example, if VTEP 208A receives a packet from endpoint 203B that is intended for endpoint 203H, VTEP 208A can analyze a routing table that maps the intended endpoint, endpoint 203H, to a specific switch that is configured to handle communications intended for endpoint 203H. VTEP 208A might not initially know, when it receives the packet from endpoint 203B, that such packet should be transmitted to VTEP 208D in order to reach endpoint 203H. Accordingly, by analyzing the routing table, VTEP 208A can lookup endpoint 203H, which is the intended recipient, and determine that the packet should be transmitted to VTEP 208D, as specified in the routing table based on endpoint-to-switch mappings or bindings, so the packet can be transmitted to, and received by, endpoint 203H as expected.

However, continuing with the previous example, in many instances, VTEP 208A may analyze the routing table and fail to find any bindings or mappings associated with the intended recipient, e.g., endpoint 203H. Here, the routing table may not yet have learned routing information regarding endpoint 203H. In this scenario, the VTEP 208A can broadcast or multicast the packet to ensure the proper switch associated with endpoint 203H can receive the packet and further route it to endpoint 203H.

Figure 3:
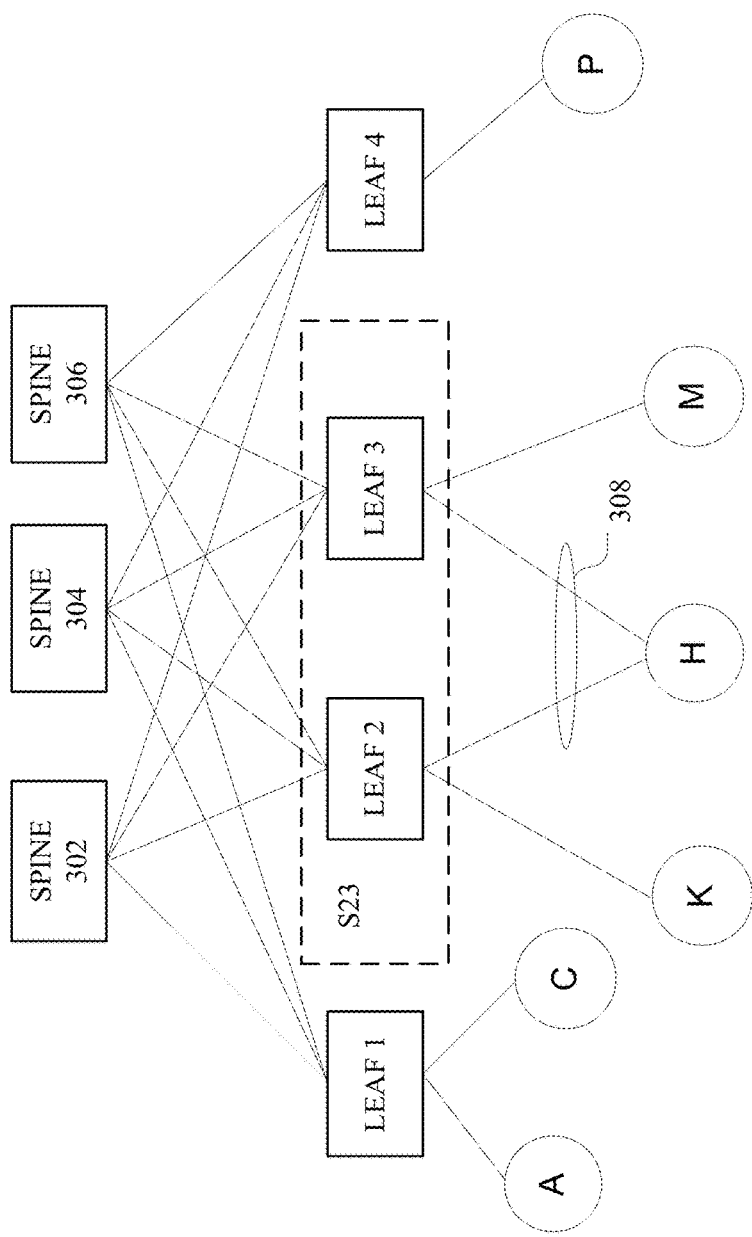
FIG. 3 illustrates an example overlay network in which a virtual port channel (VPC) can be implemented.

FIG. 3 illustrates an example of an overlay network 300 in which a virtual port channel (e.g., virtual port channel 308) can be implemented. Although overlay network 300 illustrates a full-bipartite topology, aspects of the technology are not limited to the topology illustrated in the example of FIG. 3. Rather, it is understood that implementations of the technology can be applied to networking systems that utilize VPCs in an overlay network, independent of network topology.

Network 300 includes multiple spines (e.g., spines 302, 304, and 306), as well as multiple TEPs (e.g., leaf 1, leaf 2, leaf 3 and leaf 4). In turn, each TEP is connected to one or more nodes (e.g., A, C, K, H, M and/or P). Specifically, leaf 1 is connected to nodes A and C. Leaf 2 and leaf 3 are members of peer-switch S23. As configured, leaf 2 is connected to node K, and leaf 3 is connected to node M, whereas leaf 2 and leaf 3 (as part of peer-switch S23) connected to node H, for example, via VPC 308. In this configuration, node K and node M are linked to leaf 2 and leaf 3, irrespective of VPC 308.

In the example of FIG. 3, the connection between spines 302, 304, and 306 and each leaf (e.g., leaf 1, leaf 2, leaf 3 and leaf 4), are shown in a full-bipartite graph topology; however, other topologies can be implemented. As discussed above, leaf 2 and leaf 3 form a virtual pair, e.g., in peer-switch S23. Although peer-switch S23 is shown to include leaf 2 and leaf 3, it is understood that a greater number of switches may be included, without departing from the scope of the invention.

In practice, each member of a peer-switch is configured to retain address information of each other member switch in the virtual group. Accordingly, in the example of FIG. 3, leaf 2 is pre-configured with the address information for leaf 3. Likewise, leaf 3 is pre-configured with address information for leaf 2.

Figure 4:
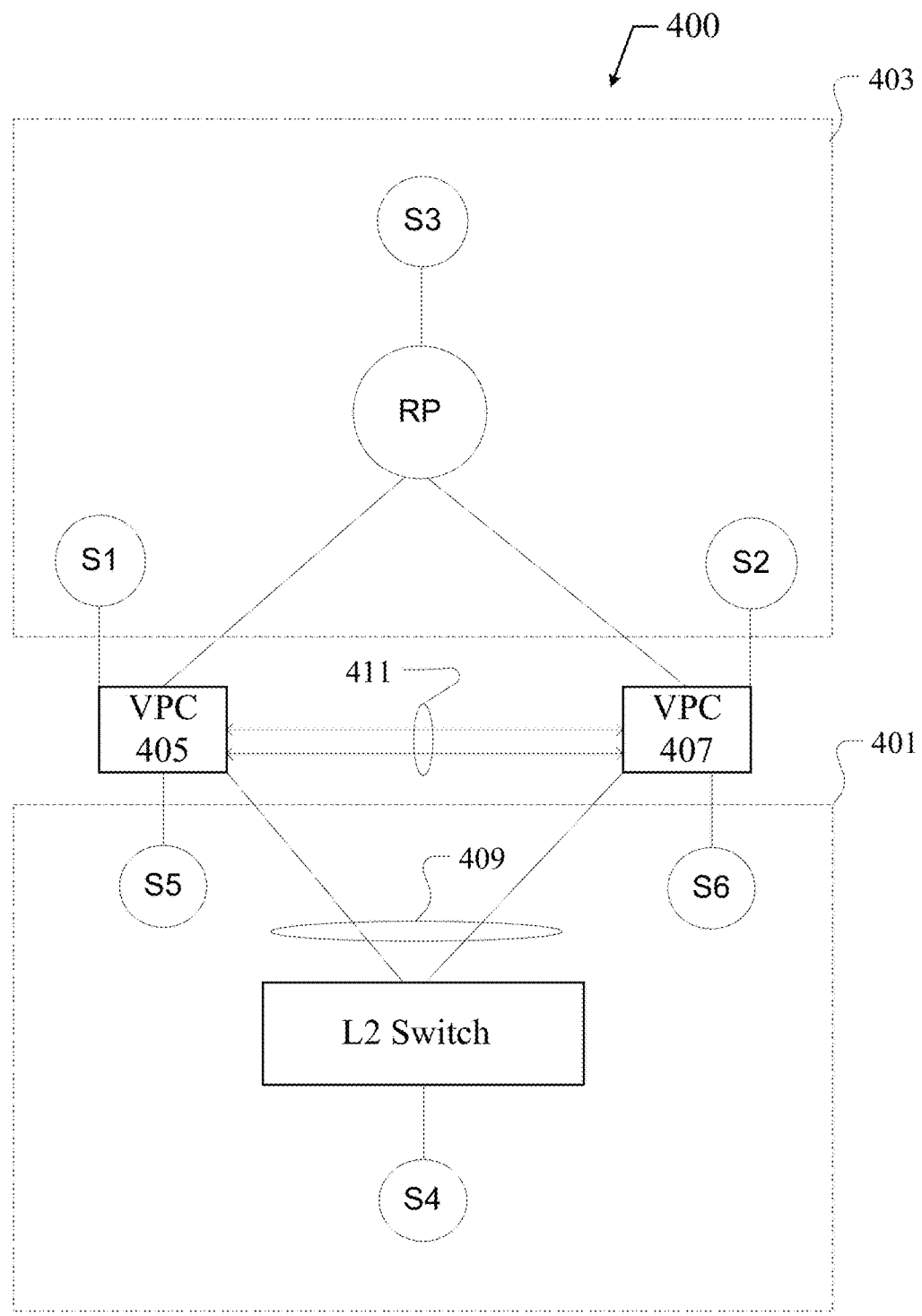
FIG. 4 illustrates an example network topology in which a VPC can be implemented as a boundary between layer 2 and layer 3 networks.

FIG. 4 illustrates an example of a network 400 in which a VPC can be configured to implement a DF election scheme, according to some aspects of the technology. In the illustrated topology, VPC switches form a boundary between layer 2 (401) and layer 3 (403) portions of network 400.

Layer 2 network portion 401 includes a L2 switch that is coupled to a node (S4). Layer 2 network portion 401 also includes nodes S5 and S6, which are coupled to VPC switch 405 and VPC switch 407, respectively. As illustrated, L2 switch is coupled to L3 network 403 via virtual port channel 409, for example, that is provided by VPC switch 405 and VPC switch 407. In the illustrated example VPC switch 405 and VPC switch 407 are communicatively coupled via peer-link 411.

It is understood that peer-link 411 can include a modified link architecture configured for transporting metric information between VPC switch 405 and VPC switch 407. For example, in some aspects peer-link 411 can include an infrastructure VLAN link configured to support traffic flow forwarding consistent with the DF election techniques discussed below. It is additionally understood that nodes (e.g., S1, S2, S3, S4, S5, and S6) may function to receive and/or send multicast traffic within network 400.

In example illustrated by FIG. 4, L3 network 403 includes a rendezvous point (RP) communicatively coupled to VPC switch 405 and VPC switch 407. L3 network 403 also includes a multiple nodes (e.g., nodes: S1, S2, and S3) that are coupled to VPC switch 405, VPC switch 407, and RP, respectively.

As discussed above, some VPC implementations do not provide a method of DF arbitration as between VPC switches when handling bidirectional PIM traffic, resulting in forwarding loops that persist until a TTL threshold is reached, and the looping packets are dropped. Aspects of the subject technology address the foregoing limitations by providing ways in which DF election is performed between VPC peer switches to determine which is permitted to inject traffic onto the RPF link, and/or to re-forward traffic received from the RPF link.

In some aspects, DF arbitration (election) is performed based on a comparison of one or more metrics corresponding with a reachability between a respective VPC switch and RP. In particular, reachability metrics can be calculated at each VPC switch, and then compared to determine which VPC switch should be designated as the DF. Depending on implementation, the metrics can include one or more unicast metrics; however, it is understood that other metrics/calculations may be performed in order to arbitrate DF election, without departing from the scope of the technology.

By way of example, each VPC switch (e.g., VPC switch 405 and VPC switch 407) calculates its respective RP metrics, and then communicates the metrics to its peer, e.g., via a peer-link to determine which VPC switch will instantiate DF operability. The DF election process can occur periodically, for example, at predetermined time intervals, or upon a conditional event, such as the occurrence (or non-occurrence) of specific network events, such as changes in one or more network parameters, etc.

Further to the example topology illustrated in FIG. 4, VPC switch 405 and VPC switch 407 can each calculate one or more metrics corresponding with their respective ability to reach RP in L3 network 403. To determine which VPC switch is to function as a DF, the metrics are provided to each respective peer, e.g., VPC switch 405 transmits its RP reachability metrics to VPC switch 407, and VPC switch 407 transmits its RP reachability metrics to VPC switch 405, via peer-link 411. Generally, the VPC switch having the best RP reachability (as determined by comparison of the various metrics) will win the DF arbitration process and designated as the DF.

The elected DF is endowed, at the exclusion of the nonelected VPC switch, to provide traffic forwarding for packets received from RP, as well as for packets directed to RP.

By way of example, if VPC switch 405 is designated as the DF, and traffic is received by VPC switch 405 (e.g., from S1), then VPC switch 405 will route the traffic to its local orphans (e.g., S5) and forward the traffic to RP along the RPF link. In this scenario, VPC switch 405 also forwards copies of the traffic to VPC switch 407, however, VPC switch 407 is prevented from directing traffic towards RP, as it is not designated as the DF.

In another example, if VPC switch 407 receives traffic (e.g., from S2), the traffic may be forwarded to one or more local orphans (e.g., S6), as well as to VPC switch 405. Traffic received by VPC switch 405 can also be forwarded to its local orphans, as well as to RP as it is the designated DF. However, VPC switch 407 cannot directly forward the traffic to RP as it is still the DF loser.

In another example, traffic received from a source behind RP (e.g., S3) is forwarded by RP to each of VPC switch 405 and VPC switch 407. In this scenario, VPC switch 405 forwards the traffic to its local orphans (e.g. S1 and S5), as well as VPC switch 407, e.g. via peer-link 411. However, because VPC switch 405 is still designated as the DF, VPC switch 407 drops any traffic natively received from RP, and route traffic received from VPC switch 405 to its local orphans. VPC switch 407 is prevented from placing traffic on the RPF link as it is still the DF loser.

In another example, traffic received by VPC switch 405, for example, from an orphaned VLAN source (e.g., S5), is forwarded to other local VLAN receivers (e.g., S1) as well as RP, e.g., on the RPF link. The traffic is also forwarded by VPC switch 405 to VPC switch 407 on peer-link 411. In this scenario, the traffic received by VPC switch 407 is forwarded to local receivers (e.g. S2 and S6); however, VPC switch 407 is prevented from forwarding the traffic to RP as it is not the designated DF.

In yet another example, traffic received by VPC switch 407 from an orphan VLAN source, such as S6 is forwarded, by VPC switch 407, to other local VLAN receivers (e.g., S2), as well as to VPC switch 405, e.g., via peer-link 411. Traffic received by VPC switch 405 is subsequently forwarded to its local receivers (e.g., S1 and S5), as well as to RP on the RPF link, because VPC switch 405 is still the designated DF.

In some aspects, failure of a designated DF can trigger a subsequent DF election so that DF operability is instantiated on a VPC peer switch with access to RP. In the foregoing example, if VPC switch 405 were to go down, a new DF election would be performed, for example, electing VPC switch 407 as the newly designated DF.

Figure 5:
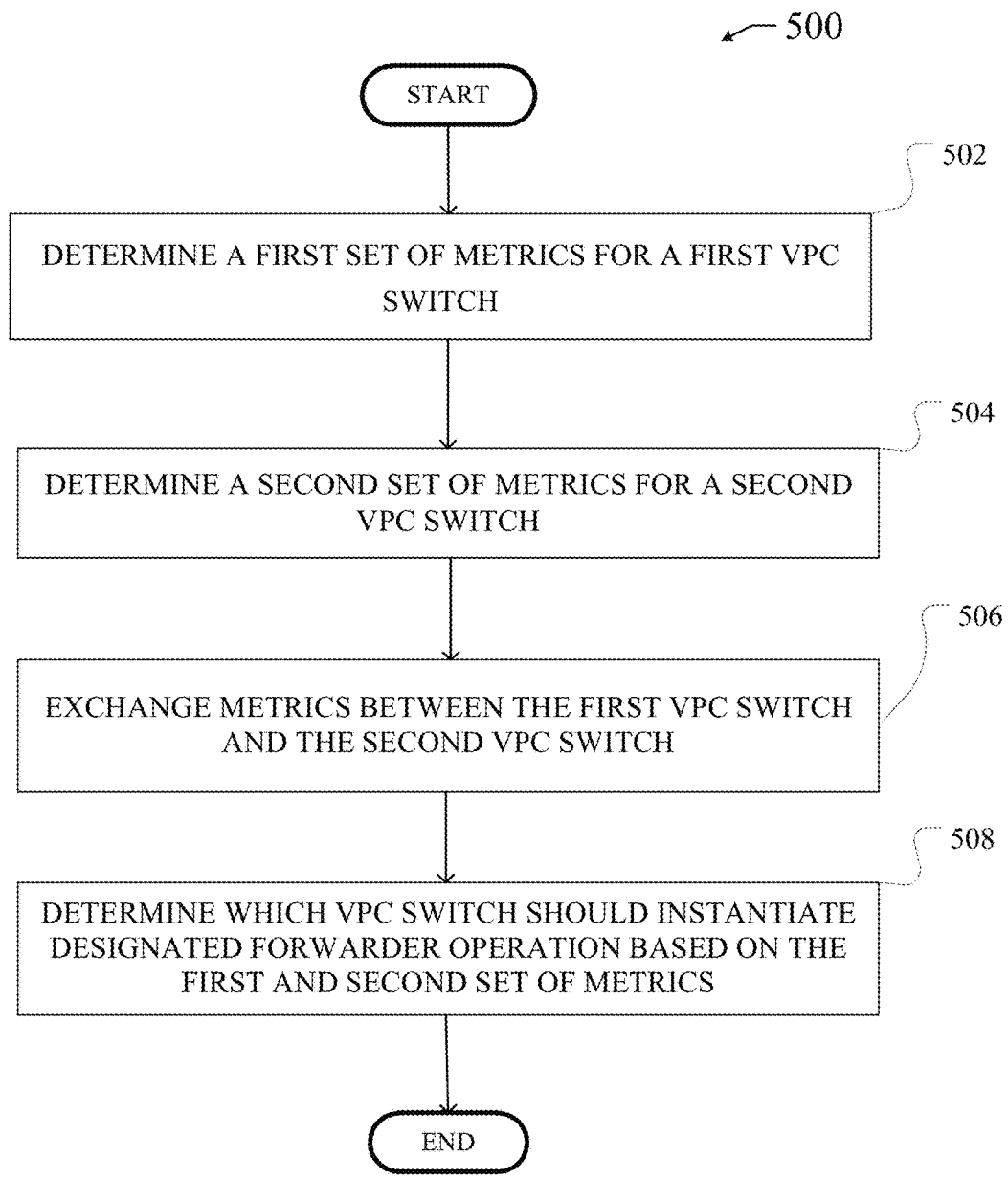
FIG. 5 illustrates steps of an example method for arbitrating direct forwarder (DF) instantiation between VPC peer switches, according to some aspects of the technology.

FIG. 5 illustrates steps of an example method 500 for arbitrating DF instantiation between VPC peers. Method 500 begins at step 502 in which a first set of metrics are determined for a first VPC switch, such as VPC switch 405, discussed above. The determined metrics can include any information indicating a relative degree or quality of connectivity between the first VPC switch and a rendezvous point (RP), for example, which is located within an L3 network (e.g., L3 network 403).

In step 504, a second set of metrics is determined at a second VPC switch (e.g., VPC switch 407), for example, that is a VPC peer of the first VPC switch. In some aspects, the first set of metrics for the first VPC switch can contain information relating to a quality or degree of connectivity between the first VPC switch and a rendezvous point (RP) located on the L3 side of the network. Similarly, the second set of metrics for the second VPC switch can include information relating to a quality or degree of connectivity between the second VPC switch and RP.

The number and type of metrics determined in the first set of metrics and/or in the second set of metrics can depend on the desired implementation. By way of example, the first/second set of metrics can include information pertaining to one or more of the following: a measure of link utilization, a number of hops (hop count to RP), a path speed (e.g., for traffic to/from RP), path length, packet loss, latency, path reliability, bandwidth, and/or throughput, etc.

Subsequently, in step 506, the determined metrics are exchanged between VPC peers. That is, the first VPC switch transmits its determined metrics to the second VPC switch, and the second VPC switch transmits its respective metrics to the first VPC switch.

Next, in step 508 a determination is made as to which VPC switch should instantiate DF operation based on the first set of metrics, and the second set of metrics. In some aspects, DF election is based on a comparison of the first set of metrics and the second set of metrics, for example, wherein DF instantiation occurs at the VPC member with the best route to RP.

Figure 6:
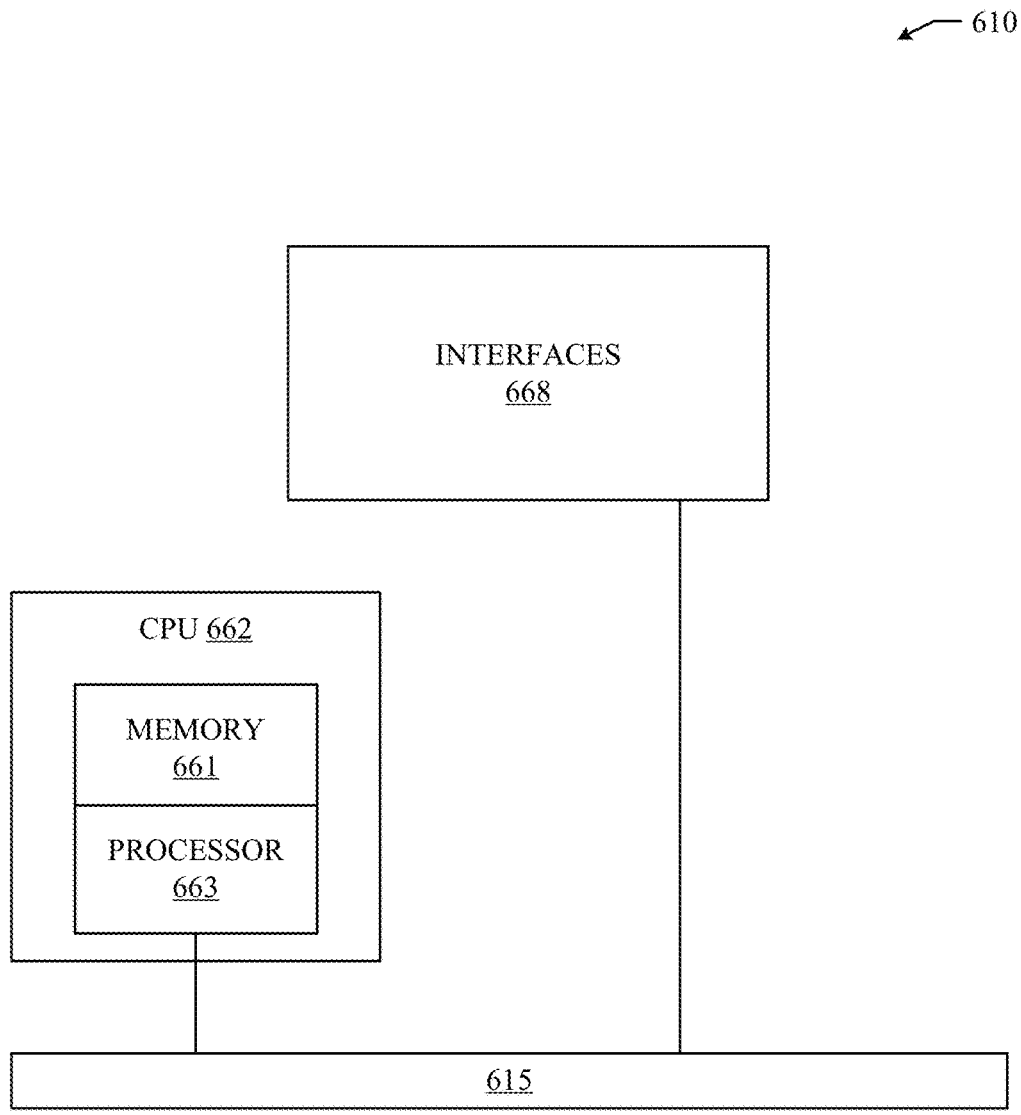
FIG. 6 illustrates an schematic diagram of an example network device, according to some aspects of the technology.

FIG. 6 illustrates an example network device 610 suitable for implementing the present invention. Network device (e.g., a router) 610 that includes a master central processing unit (CPU) 662, interfaces 668, and bus 615 (e.g., a PCI bus). When acting under the control of appropriate software or firmware, CPU 662 is responsible for executing packet management, error detection, and/or routing functions, such as miscabling detection functions, for example. The CPU 662 can accomplish all these functions under the control of software including an operating system and any appropriate applications software. CPU 662 may include one or more processors 663 such as a processor from the Motorola family of microprocessors or the MIPS family of microprocessors. In alternative aspects, processor 663 is specially designed hardware for controlling the operations of router 610. In a specific implementation, memory 661 (such as non-volatile RAM and/or ROM) also forms part of CPU 662. However, there are many different ways in which memory could be coupled to the system. Memory 661 can include various types of non-transitory computer readable storage media, including but not limited to one or more of: magnetic storage media, optical storage media, and/or transistor based storage media, and the like.

Interfaces 668 are typically provided as interface cards (sometimes referred to as "line cards"). Generally, they control the sending and receiving of data packets over the network and sometimes support other peripherals used with router 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like.

Although the system shown in FIG. 6 is one specific network device of the present invention, it is not the only network device architecture on which aspects of the subject technology can be implemented. For example, an architecture having a single processor that handles communications as well as routing computations, etc. is often used. Further, other types of interfaces and media may also be implemented.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for transporting bidirectional multicast traffic over a virtual port channel (VPC), comprising:
    determining a first set of metrics for a first VPC switch;
    determining a second set of metrics for a second VPC switch;
    sending the first set of metrics from the first VPC switch to the second VPC switch;
    receiving, at the first VPC switch, the second set of metrics for the second VPC switch; and
    determining, at the first VPC switch, whether to instantiate a designated forwarder (DF) operation based on the first set of metrics and the received second set of metrics indicating the first VPC switch provides a more efficient network route to a rendezvous point (RP) than the second VPC switch;
    receiving, at the second VPC switch, the first set of metrics for the second VPC switch; and
    determining, at the second VPC switch, whether to instantiate a designated forwarder (DF) operation based on the received first set of metrics and the second set of metrics indicating the second VPC switch provides a more efficient network route to a rendezvous point (RP) than the first VPC switch;
    wherein the first and second VPC switches self-determine whether or not they will be a direct forwarder.

2. The computer-implemented method of claim 1, wherein instantiation of DF operation at the first VPC prevents the second VPC switch from forwarding traffic toward a rendezvous point in a layer 3 network.

3. The computer-implemented method of claim 1, wherein the first VPC switch and the second VPC switch are configured to provide a virtual port channel link with a layer 2 network.

4. The computer-implemented method of claim 1, wherein the first VPC switch and the second VPC switch are communicatively coupled with a rendezvous point (RP) in a layer 3 network.

5. The computer-implemented method of claim 1, wherein the first VPC switch and the second VPC switch form a boundary between a layer 2 network and a layer 3 network.

6. The computer-implemented method of claim 1, wherein determining whether to instantiate a DF operation further comprises:
    comparing the first set of metrics with the second set of metrics to determine if the first VPC switch provides a more efficient network route to a rendezvous point (RP) than the second VPC switch, and
    wherein the first set of metrics and the second set of metrics comprise unicast metrics.

7. A system for transporting bidirectional multicast traffic over a virtual port channel (VPC), comprising:
    one or more processors; and
    a computer-readable medium comprising instructions stored therein, which when executed by the processors, cause the processors to perform operations comprising:
        determining a first set of metrics for a first VPC switch;
        determining a second set of metrics for a second VPC switch;
        sending the first set of metrics from the first VPC switch to the second VPC switch;
        receiving, at the first VPC switch, the second set of metrics for the second VPC switch; and
        determining, at the first VPC switch, whether to instantiate a designated forwarder (DF) operation based on the first set of metrics and the received second set of metrics indicating the first VPC switch provides a more efficient network route to a rendezvous point (RP) than the second VPC switch;
        receiving, at the second VPC switch, the first set of metrics for the second VPC switch; and
        determining, at the second VPC switch, whether to instantiate a designated forwarder (DF) operation based on the received first set of metrics and the second set of metrics indicating the second VPC switch provides a more efficient network route to a rendezvous point (RP) than the first VPC switch;
        wherein the first and second VPC switches self-determine whether or not they will be a direct forwarder.

8. The system of claim 7, wherein instantiation of DF operation at the first VPC prevents the second VPC switch from forwarding traffic toward a rendezvous point in a layer 3 network.

9. The system of claim 7, wherein the first VPC switch and the second VPC switch are configured to provide a virtual port channel link with a layer 2 network.

10. The system of claim 7, wherein the first VPC switch and the second VPC switch are communicatively coupled with a rendezvous point (RP) in a layer 3 network.

11. The system of claim 7, wherein the first VPC switch and the second VPC switch form a boundary between a layer 2 network and a layer 3 network.

12. The system of claim 7, wherein determining whether to instantiate a DF operation further comprises:

comparing the first set of metrics with the second set of metrics to determine if the first VPC switch provides a more efficient network route to a rendezvous point (RP) than the second VPC switch, and wherein the first set of metrics and the second set of metrics comprise unicast metrics.

13. A non-transitory computer-readable storage medium comprising instructions stored therein, which when executed by one or more processors, cause the processors to perform operations comprising:

determining a first set of metrics for a first VPC switch;

determining a second set of metrics for a second VPC switch;

sending the first set of metrics from the first VPC switch to the second VPC switch;

receiving, at the first VPC switch, the second set of metrics for the second VPC switch; and determining, at the first VPC switch, whether to instantiate a designated forwarder (DF) operation based on the first set of metrics and the received second set of metrics indicating the first VPC switch provides a more efficient network route to a rendezvous point (RP) than the second VPC switch;

receiving, at the second VPC switch, the first set of metrics for the second VPC switch; and determining, at the second VPC switch, whether to instantiate a designated forwarder (DF) operation based on the received first set of metrics and the second set of metrics indicating the second VPC switch provides a more efficient network route to a rendezvous point (RP) than the first VPC switch;

wherein the first and second VPC switches self-determine whether or not they will be a direct forwarder.

14. The non-transitory computer-readable storage medium of claim 13, wherein instantiation of DF operation at the first VPC prevents the second VPC switch from forwarding traffic toward a rendezvous point in a layer 3 network.

15. The non-transitory computer-readable storage medium of claim 13, wherein the first VPC switch and the second VPC switch are configured to provide a virtual port channel link with a layer 2 network.

16. The non-transitory computer-readable storage medium of claim 13, wherein the first VPC switch and the second VPC switch form a boundary between a layer 2 network and a layer 3 network.

17. The non-transitory computer-readable storage medium of claim 13, wherein determining whether to instantiate a DF operation further comprises:

comparing the first set of metrics with the second set of metrics to determine if the first VPC switch provides a more efficient network route to a rendezvous point (RP) than the second VPC switch, and wherein the first set of metrics and the second set of metrics comprise unicast metrics.

* * * * *